US012342143B2

(12) United States Patent
Wu et al.

(10) Patent No.: US 12,342,143 B2
(45) Date of Patent: Jun. 24, 2025

(54) METHOD AND SYSTEM FOR SWITCHING SOUND CHANNEL OF HEADSET, AND HEADSET TERMINAL

(71) Applicant: HUAWEI TECHNOLOGIES CO., LTD., Guangdong (CN)

(72) Inventors: Rongrong Wu, Dongguan (CN); Xiangao Song, Shenzhen (CN); Guoli Ping, Dongguan (CN); Zheng Ju, Shenzhen (CN); Yong Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/326,122

(22) Filed: May 31, 2023

(65) Prior Publication Data

US 2023/0308806 A1 Sep. 28, 2023

Related U.S. Application Data

(63) Continuation of application No. PCT/CN2021/132727, filed on Nov. 24, 2021.

(30) Foreign Application Priority Data

Dec. 1, 2020 (CN) ......................... 202011387391.9

(51) Int. Cl.

| | |
|---|---|
| ***H04R 5/04*** | (2006.01) |
| ***H04R 5/033*** | (2006.01) |
| ***H04S 1/00*** | (2006.01) |

(52) U.S. Cl.
CPC ............... *H04R 5/04* (2013.01); *H04R 5/033* (2013.01); *H04S 1/007* (2013.01)

(58) Field of Classification Search
None
See application file for complete search history.

(56) References Cited

U.S. PATENT DOCUMENTS

2010/0142719 A1 6/2010 Chiba et al.
2014/0079238 A1* 3/2014 Bastide ................. H04R 5/033 381/74

(Continued)

FOREIGN PATENT DOCUMENTS

CN 104080028 A 10/2014
CN 106254993 A 12/2016

(Continued)

OTHER PUBLICATIONS

English language translation of CN108391205A (Bixiang), pp. 1-13. (Year: 2018).*

(Continued)

*Primary Examiner* — Paul W Huber

(57) ABSTRACT

Embodiments of the present disclosure disclose a method and a system for switching a sound channel of a headset, and a headset terminal, to accurately identify and determine a left-ear wearing status and a right-ear wearing status of a headset terminal, and accurately send a left-channel input audio signal and a right-channel input audio signal. A user does not need to manually switch between a left channel and a right channel of the headset terminal. This greatly improves the convenience of using the headset terminal.

12 Claims, 7 Drawing Sheets

(56) References Cited

U.S. PATENT DOCUMENTS

| | | | | |
|---|---|---|---|---|
| 2017/0208394 A1* | 7/2017 | Xu | ....................... | H04R 1/1041 |
| 2019/0132666 A1* | 5/2019 | Mou | .................... | H04R 1/1041 |

FOREIGN PATENT DOCUMENTS

| | | | |
|---|---|---|---|
| CN | 106358127 | A | 1/2017 |
| CN | 106851486 | A | 6/2017 |
| CN | 108391205 | A | 8/2018 |

OTHER PUBLICATIONS

BS EN 60318-4:2010, Electroacoustics Simulators—Simulators of human head and ear, Part 4: Occluded-ear simulator for the measurement of earphones coupled to the ear by means of ear inserts, May 25, 2019, total 24 pages.

International Search Report and Written Opinion issued in PCT/CN2021/132727, dated Feb. 9, 2022, 8 pages.

* cited by examiner

METHOD AND SYSTEM FOR SWITCHING SOUND CHANNEL OF HEADSET, AND HEADSET TERMINAL

CROSS-REFERENCE TO RELATED APPLICATIONS

This application is a continuation of International Application No. PCT/CN2021/132727, filed on Nov. 24, 2021, which claims priority to Chinese Patent Application No. 202011387391.9, filed on Dec. 1, 2020. The disclosures of the aforementioned applications are hereby incorporated by reference in their entireties.

TECHNICAL FIELD

The present disclosure relates to the field of headset technologies, and in particular, to a method and a system for switching a sound channel of a headset, and a headset terminal.

BACKGROUND

With popularization of mobile terminals, an increasing number of people prefer to use mobile terminals to listen to music and watch videos. To ensure good audio-visual experience, many users use headsets to listen to audio. To improve audio experience with a headset, different sound channels are designed for the headset, so that a user can hear stereo audio.

A stereo headset includes a left earphone and a right earphone, where the left earphone permanently outputs a left channel, and the right earphone permanently outputs a right channel. In a conventional technology, a user needs to manually distinguish between a left earphone and a right earphone before putting on a stereo headset, and may even put the left earphone on a right ear and the right earphone on a left ear. This seriously affects the convenience of using the headset. This characteristic is a critical disadvantage in user market research.

Actually, if a user puts a left earphone on a right ear and a right earphone on a left ear when listening to stereo audio, a left channel and a right channel are reversed. To be specific, audio experience of the user is quite likely to be opposite to that in a real sound environment of music or a video. Especially, if the left channel and the right channel are reversed during video watching, to be specific, the left ear receives right-channel audio, and the right ear receives left-channel audio, a directional action on a video screen is opposite to matching audio. This seriously degrades user experience.

In addition, the user can find the mistake only after the user has incorrectly put on the earphones and heard audio, and the user can only manually switch the left earphone and the right earphone to restore normal left and right channels. This also greatly affects convenience of use.

In a conventional technology, a Chinese patent with an application number of CN106254993B discloses an adaptive left/right channel control method and apparatus for a headset. The method includes: A terminal receives a control signal sent by a target headset, where the target headset includes a speaker and at least two pressure sensors, and the control signal is generated when the pressure sensors of the target headset detect a wearing position of the target headset. The terminal determines the wearing position of the target headset based on the control signal. The terminal detects whether a first channel circuit of the terminal connected to the target headset matches the wearing position of the target headset; and if the first channel circuit of the terminal connected to the target headset does not match the wearing position of the target headset, switches a channel circuit of the terminal connected to the target headset from the first channel circuit to a second channel circuit. An embodiment of the conventional technology further discloses a corresponding apparatus. In the technical solution provided in this embodiment, a user does not need to distinguish between a left channel and a right channel before putting on the headset. To be specific, obtained left-channel and right-channel sound signals are always correct regardless of how the user wears the headset. This improves auditory effects for the user. A disadvantage of this patent lies in that an additional sensor component (the pressure sensors) needs to be added for identifying the wearing position. This is not conducive to weight reduction and miniaturization of a product, and affects wearing comfort of the product. In addition, it cannot be ensured that the pressure sensors can accurately identify a difference between wearing on a left ear and wearing on a right ear.

In another conventional technology, a Chinese patent with an application number of CN104080028B discloses an identification method, an electronic device, and a headset. The method is applied to an electronic device, and the electronic device is connected to a headset. The method includes: When the headset is put on ears of a user, the electronic device obtains first biometric feature information that is sent by the headset and that indicates first biometric features of the ears; and identifies, based on the first biometric feature information, a correspondence between a first audio output unit and a second audio output unit of the headset and a left ear and a right ear of the ears. In this method, the electronic device can identify the correspondence between the first audio output unit and the second audio output unit of the headset and the left ear and the right ear of the ears. A disadvantage of this patent also lies in that an additional sensor component (a temperature sensor, a biological sensor, or an image sensor) needs to be added for identifying a wearing position. This is not conducive to weight reduction and miniaturization of a product, and affects wearing comfort of the product. In addition, it cannot be ensured that the temperature sensor or the biological sensor can accurately identify a difference between wearing on a left ear and wearing on a right ear.

In another conventional technology, a Chinese patent with an application number of CN106358127A discloses a left/right channel switching method and a mobile terminal, and relates to the field of communication technologies. The method includes: receiving a control instruction that is sent by a headset based on a detection result of at least one sensor, where the sensor is disposed on an outer surface of a headset frontend of the headset, and the detection result indicates whether the headset frontend of the headset fits into an ear canal corresponding to the headset frontend; and controlling, according to the control instruction, a mobile terminal to switch between a left-channel audio signal and a right-channel audio signal. This resolves problems that switching between a left-channel audio signal and a right-channel audio signal cannot be automatically performed based on a wearing status of a headset, an operation is complex, and user experience is poor. In this technology, the mobile terminal is controlled to automatically switch between a left channel and a right channel based on a wearing status of the headset, and a user does not need to manually adjust a left headset frontend and a right headset frontend. This reduces manual operations and therefore improves user experience. A disadvantage of this patent lies in that electrical impedance is insensitive to a wearing manner, and different wearing manners (wearing on a left ear and wearing on a right ear) do not cause a significant difference in impedance, and therefore a status of a left ear and a status of a right ear can hardly be distinguished or identified.

SUMMARY

In view of this, embodiments of the present disclosure provide a method and a system for switching a sound channel of a headset, and a headset terminal, to resolve a technical problem in a conventional technology that a user can only manually switch a left earphone and a right earphone, affecting convenience of using a headset.

According to a first aspect, an embodiment of the present disclosure provides a method for switching a sound channel of a headset. The method includes the following steps:

- receiving a sound channel detection signal that comes from a sound production apparatus and that is picked up by a pickup apparatus in a headset terminal;
- performing signal processing on the received sound channel detection signal to obtain feature information of a left earphone and feature information of a right earphone;
- comparing the feature information of the left earphone with preset left-channel feature information, and comparing the feature information of the right earphone with preset right-channel feature information, to obtain a comparison result; and
- when the comparison result indicates inconsistency, switching a left-channel signal and a right-channel signal, and then outputting a correct left-channel signal and a correct right-channel signal.

In the solution provided in this embodiment, whether the left earphone and the right earphone output correct sound channel signals is identified according to a principle that an ear canal-eardrum impedance characteristic of a human ear affects an acoustic characteristic of an in-ear headset. In this way, the following technical effects are achieved: The headset terminal can be controlled without an operation performed by a user on a mobile terminal, so that sound channel signals of the left earphone and the right earphone can be adaptively switched.

In an implementation solution, before the step of receiving a sound channel detection signal that comes from a sound production apparatus and that is picked up by a pickup apparatus in a headset terminal, the method further includes the following step:

- presetting left-channel feature information and right-channel feature information.

In the solution provided in this embodiment, determined left-channel feature information and right-channel feature information are preset, so that each headset terminal has determined criteria for identifying a left-channel signal and a right-channel signal upon delivery.

In an implementation solution, the step of presetting left-channel feature information and right-channel feature information further includes the following steps:

- putting the left earphone on a left ear and then a right ear, and putting the right earphone on the left ear and then the right ear;
- transmitting, by the sound production apparatus, the sound channel detection signal;
- receiving, by the pickup apparatus, the sound channel detection signal;
- performing Fourier transform on the sound channel detection signal;
- obtaining the preset left-channel feature information and right-channel feature information; and
- storing the preset left-channel feature information and right-channel feature information.

In the solution provided in this embodiment, accurate left-channel feature information and right-channel feature information can be obtained as a reference basis. A frequency band within 1 kHz to 10 kHz serves as a spectrum identification feature. After identification is performed, equalization compensation is performed on medium and high spectra, to ensure a balance and sound quality for the left ear and the right ear.

In an implementation solution, the step of presetting left-channel feature information and right-channel feature information further includes the following steps:

- prompting a user to correctly put the earphones on a left ear and a right ear for the first time;
- transmitting, by the sound production apparatus, the sound channel detection signal;
- receiving, by the pickup apparatus, the sound channel detection signal;
- processing, by the pickup apparatus, the sound channel detection signal to obtain the preset left-channel feature information and right-channel feature information; and
- storing the preset left-channel feature information and right-channel feature information.

In the solution provided in this embodiment, after the earphones are correctly worn for the first time, the user may not need to specially distinguish between the left ear and the right ear, and the earphones may automatically detect feature information of the left ear and the right ear after the earphones are put on. If the feature information of the left ear and the right ear is the same as feature information detected during the first wearing, it can be determined that the earphones are correctly worn; otherwise, sound channels are automatically switched, and then correct audio signals are output to the left ear and the right ear.

In an implementation solution, before a left-channel signal and a right-channel signal are output, the method further includes the following step:

- separately performing equalization compensation on the left-channel signal and the right-channel signal that are to be output.

In the solution provided in this embodiment, a balance and sound quality of output audio signals of the left earphone and the right earphone can be ensured.

In an implementation solution, a frequency band of the preset left-channel feature information and right-channel feature information ranges from 1 kHz to 10 KHz.

In an implementation solution, in the step of performing signal processing on the received sound channel detection signal to obtain feature information of a left earphone and feature information of a right earphone, the signal processing is Fourier transform or time domain algorithm transform.

According to a second aspect, an embodiment of the present disclosure provides a system for switching a sound channel of a headset. The system includes a receiving unit, a processing unit, a comparison unit, a switching unit, and an output unit.

The receiving unit is configured to receive a sound channel detection signal that comes from a sound production apparatus and that is picked up by a pickup apparatus in a headset terminal.

The processing unit is configured to perform signal processing on the received sound channel detection signal to obtain feature information of a left earphone and feature information of a right earphone.

The comparison unit is configured to compare the feature information of the left earphone with preset left-channel feature information, and compare the feature information of the right earphone with preset right-channel feature information, to obtain a comparison result.

The switching unit is configured to switch a left-channel signal and a right-channel signal when the comparison result indicates inconsistency.

The output unit is configured to output a correct left-channel signal and a correct right-channel signal.

In the solution provided in this embodiment, a left-ear wearing status and a right-ear wearing status of the headset terminal can be accurately identified and determined, and a left-channel input audio signal and a right-channel input audio signal can be accurately sent. A user does not need to manually switch a left channel and a right channel of the headset terminal. This greatly improves convenience of using the headset terminal.

In an implementation solution, the system further includes a presetting unit, and the presetting unit is configured to preset left-channel feature information and right-channel feature information.

In the solution provided in this embodiment, the presetting unit presets determined left-channel feature information and right-channel feature information, so that each headset terminal has determined criteria for identifying a left-channel signal and a right-channel signal upon delivery.

According to a third aspect, an embodiment of the present disclosure provides a headset terminal, including two earphones and the system for switching a sound channel of a headset according to the second aspect. The system is mounted in the earphones.

In the solution provided in this embodiment, with existing components in earphones, a left-ear wearing status and a right-ear wearing status of a stereo headset can be accurately identified and determined, and a left-channel input audio signal and a right-channel input audio signal can be accurately sent. A user does not need to manually switch the earphones. This greatly improves convenience of using the stereo headset without increasing hardware costs, and achieves stable improvement effects and significant benefits.

In an implementation solution, the earphone includes a front cavity part and a body part, and the body part is connected to the front cavity part;

- the front cavity part includes a front cavity and an earphone sleeve, and the earphone sleeve covers the front cavity; and
- the body part includes a housing, a front cover, a sound production apparatus, a pickup apparatus, and a processing apparatus, where the housing is connected to the front cavity, the front cover is disposed at a junction between the housing and the front cavity and seals a frontend of the housing that is close to the front cavity, the sound production apparatus, the pickup apparatus, and the processing apparatus are all mounted in a cavity sealed by the front cover, mounting positions of pickup apparatuses in the two earphones are different, and the sound production apparatus and the pickup apparatus are electrically connected to the processing apparatus.

In the solution provided in this embodiment, based on different positions of the pickup apparatus in an ear canal, a high-frequency spectrum part in feature information captured by the pickup apparatus varies due to a load impedance variation in the front cavity part. In this case, there is definitely a fixed frequency response difference between a left ear and a right ear, for identifying the left ear and the right ear. This can help the headset terminal accurately identify and determine a left-ear wearing status and a right-ear wearing status of the earphones, and accurately send a left-channel signal and a right-channel signal. A user does not need to manually switch the earphones. This greatly improves the convenience of using the headset terminal.

In an implementation solution, the earphone has an outline that is symmetric with respect to a plane of symmetry, the pickup apparatus is located on one side of the plane of symmetry of the earphone, and a distance between the pickup apparatus and the plane of symmetry is at least 2 millimeters.

In the solution provided in this embodiment, when the earphone is put on the left ear and when the earphone is put on the right ear, a high-frequency spectrum part in feature information captured by the pickup apparatus varies due to asymmetry of the pickup apparatus, so that different feature information is obtained as a basis for identifying a left-channel signal and a right-channel signal.

In a implementation solution, the front cavity part is asymmetric with respect to the plane of symmetry, and a volume of the front cavity part is at least 0.2 cubic centimeter.

In an implementation solution, the front cavity part further includes a tip, the tip extends from one side of the front cavity, and an outline of the tip is symmetric with respect to the plane of symmetry.

In the solution provided in this embodiment, because of the asymmetric structure of the front cavity part, when a same earphone is put on the left ear or the right ear, a front cavity part of the earphone is in an upper part or a lower part. In this case, different ear canal impedance occurs when a tip fits into an ear canal to be coupled to the ear canal. When a left earphone and a right earphone are worn reversely, a high-frequency spectrum captured by the pickup apparatus varies due to a load impedance variation in the front cavity part, so that different feature information is obtained as a basis for identifying a left-channel signal and a right-channel signal.

In an implementation solution, the sound production apparatus, the pickup apparatus, and the processing apparatus are connected to an operating circuit of the headset terminal, the processing apparatus is connected to a power supply, a memory, a radio frequency circuit, a Bluetooth module, a digital signal processor, a sensor, and an input/output interface, the digital signal processor is connected to an audio circuit, and the sound production apparatus and the pickup apparatus are connected to the audio circuit.

According to a fourth aspect, an embodiment of the present disclosure provides a computer-readable storage medium, including a program or instructions. When the program or instructions run on a computer, the method according to the first aspect is performed.

Compared with a conventional technology, the technical solutions have at least the following beneficial effects:

In the method and the system for switching a sound channel of a headset, and the headset terminal that are disclosed in embodiments of the present disclosure, a left-ear wearing status and a right-ear wearing status of the headset terminal can be accurately identified and determined, and a left-channel input audio signal and a right-channel input audio signal can be accurately sent. A user does not need to manually switch a left channel and a right channel of the headset terminal. This greatly improves the convenience of using the headset terminal.

BRIEF DESCRIPTION OF DRAWINGS

To describe technical solutions in embodiments of the present disclosure more clearly, the following briefly describes accompanying drawings used in embodiments. Clearly, the accompanying drawings in the following descriptions show merely some embodiments of the present disclosure, and a person of ordinary skill in the art may still derive other drawings from these accompanying drawings without creative efforts.

REFERENCE NUMERALS

- 10: left earphone; 20: right earphone; 30: headset cable; 40: adapter; 50: ear canal;
- 100: front cavity part; 101: front cavity; 102: earphone sleeve; 103: tip;
- 200: body part; 201: housing; 202: front cover; 203: sound production apparatus; 204: pickup apparatus; and 205: processing apparatus.

DESCRIPTION OF EMBODIMENTS

For ease of understanding technical solutions of the present disclosure, the following describes embodiments of the present disclosure in detail with reference to accompanying drawings.

It should be noted that the described embodiments are merely some but not all of embodiments of the present disclosure. All other embodiments obtained by a person of ordinary skill in the art based on embodiments of the present disclosure without creative efforts shall fall within the protection scope of the present disclosure.

The following describes embodiments of a headset terminal and an implementation method of the headset terminal. The headset terminal may be headphones, an over-the-ear headset, an in-ear headset, earbuds, a true wireless stereo (TWS) headset, a wired stereo headset, or the like. The headset terminal may access various types of communication systems, for example, a long term evolution (LTE) system, a 5th-generation (5G) system, a new radio access technology (NR) system, a future communication system such as a 6G system, or a wireless local area network (WLAN).

Embodiment 1

Figure 1:
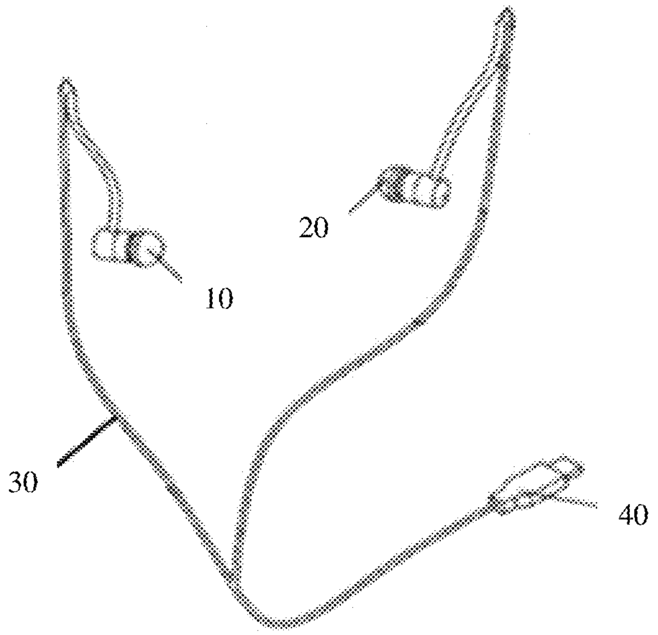
FIG. 1 is a schematic diagram of a structure of a headset terminal according to Embodiment 1 of the present disclosure.

FIG. 1 is a schematic diagram of a headset terminal according to Embodiment 1 of the present disclosure.

The headset terminal includes a left earphone 10, a right earphone 20, a headset cable 30, and an adapter 40. One end of the headset cable 30 is connected to the left earphone 10 and the right earphone 20, and the other end of the headset cable 30 is connected to the adapter 40. The left earphone 10 and the right earphone 20 have similar outline shapes, external structures, and internal structures, and are designed with a slight difference only to adapt to structures of a left ear canal and a right ear canal. Therefore, for ease of description, the following descriptions of an external shape and an internal structure of an earphone 10/20 are applicable to the left earphone 10 and the right earphone 20. If the left earphone 10 and the right earphone 20 have a structural difference, the structural difference is described below.

Figure 2:
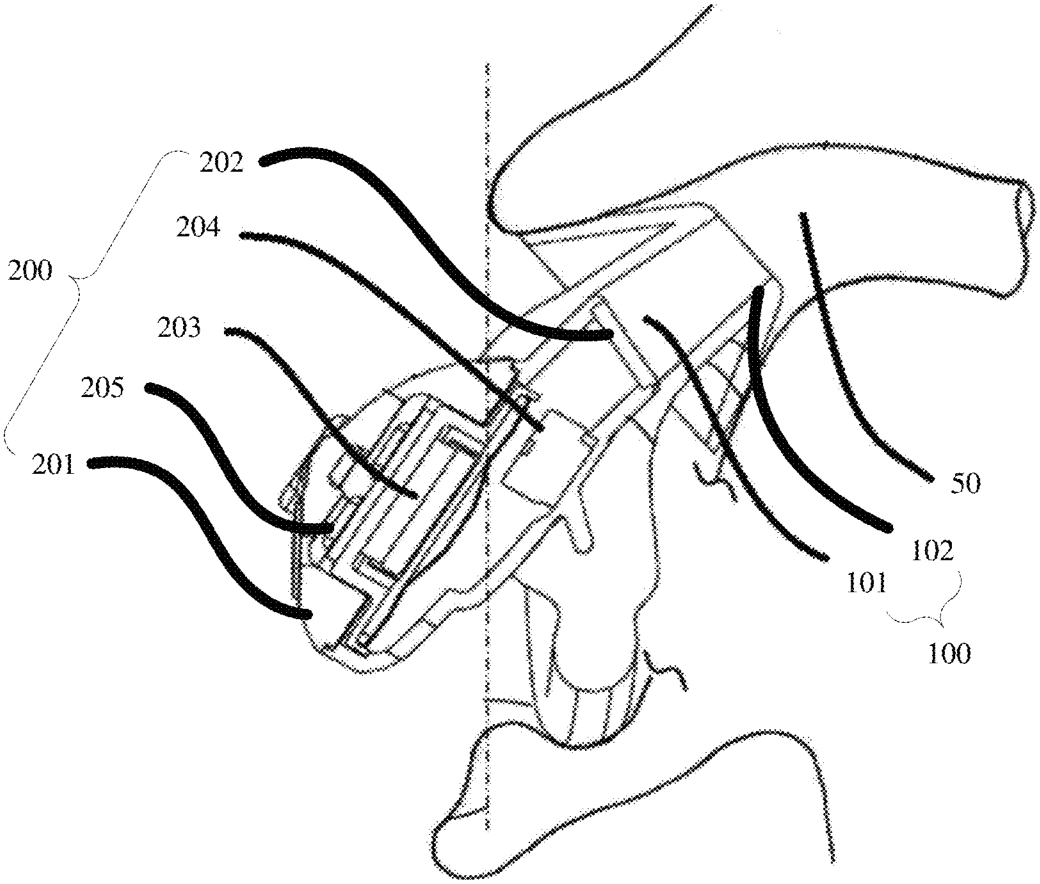
FIG. 2 is a diagram of an internal structure of an earphone in a headset terminal according to Embodiment 1 of the present disclosure, and a schematic diagram of a state in which the earphone is inserted into an ear canal.
Figure 3:
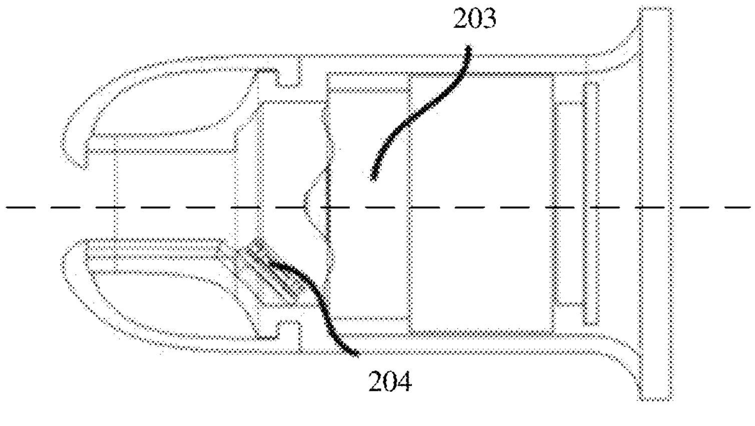
FIG. 3 is a cross-sectional view of an internal structure of an earphone in a headset terminal according to Embodiment 1 of the present disclosure, and shows a case in which a pickup apparatus is located on one side of a plane of symmetry of the earphone.

As shown in FIG. 2 and FIG. 3, the earphone 10/20 has a front cavity part 100 and a body part 200. The front cavity part 100 is inserted into an ear canal 50, and the body part 200 is connected to the front cavity part 100 and is located outside the ear canal 50. Specifically, the front cavity part 100 includes a front cavity 101 and an earphone sleeve 102. The body part 200 includes a housing 201, a front cover 202, a sound production apparatus 203, a pickup apparatus 204, and a processing apparatus 205. The earphone sleeve 102 covers the front cavity 101, and when the earphone 10/20 extends into the ear canal 50, the earphone sleeve 102 expands an ear wall and is stuck in the ear canal 50. The front cover 202 is disposed at a junction between the housing 201 and the front cavity 101, and seals a frontend of the housing 201 that is close to the front cavity 101. The sound production apparatus 203, the pickup apparatus 204, and the processing apparatus 205 are all mounted in a cavity, sealed by the front cover 202, of the housing 201. The sound production apparatus 203 and the pickup apparatus 204 are electrically connected to the processing apparatus 205. The sound production apparatus 203 is configured to transmit a sound channel detection signal. The pickup apparatus 204 is configured to capture the sound channel detection signal. The processing apparatus is configured to perform computing and processing on the sound channel detection signal. The sound production apparatus 203 is a player. The pickup apparatus 204 is a feedback microphone. The sound channel detection signal is a sound signal, enters the ear canal 50 through the front cavity part 100 of the earphone 10/20, and can be captured by the feedback microphone serving as the pickup apparatus 204.

To enable the headset terminal to automatically identify a matching status between sound channel signals and the left earphone 10 and the right earphone 20 and automatically switch the sound channel signals of the left earphone 10 and the right earphone 20, sound channel detection signals that are transmitted by sound production apparatuses 203 of the two earphones 10 and 20 and that are captured and processed by pickup apparatuses 204 should be different. Processing apparatuses 205 can identify left-ear and right-ear wearing information of a user by processing the sound channel detection signals. Finally, a correct left-channel signal and a correct right-channel signal are output.

As shown in FIG. 3, an outline of each of the two earphones 10 and 20 is usually symmetric with respect to a plane of symmetry of the earphone. The plane of symmetry is represented by a dashed line in the figure. Most internal structures of the earphone, for example, layouts of the sound production apparatus 203 and the processing apparatus 205, are also the same. However, the front cavity part 100 is asymmetric with respect to the plane of symmetry, and a volume of the front cavity part 100 is at least 0.2 cubic centimeter. However, to obtain feature information indicating ear canals 50 on different sides, the pickup apparatuses 204 are mounted at different positions. The pickup apparatus 204 is not located on the plane of symmetry of the earphone 10/20, but is mounted on one side of the plane of symmetry of the earphone 10/20, and a distance between the pickup apparatus 204 and the plane of symmetry is at least 2 millimeters. When the earphone is put on a left ear and when the earphone is put on a right ear, a high-frequency spectrum part in feature information captured by the pickup apparatus 204 varies due to asymmetry of the pickup apparatus 204, so that different feature information is obtained as a basis for identifying a left-channel signal and a right-channel signal. When the earphone 10/20 is put on the left ear and when the earphone 10/20 is put on the right ear, due to different positions of the pickup apparatus 204 in the ear canal 50, a high-frequency spectrum part in feature information captured by the pickup apparatus 204 varies due to a load impedance variation in the front cavity part 100. In this case, there is definitely a fixed frequency response difference between the left ear and the right ear. The response difference mainly results from a mounting position variation of the pickup apparatus 204, and does not change with a degree of tightness of wearing (that is, a sound leakage amount). The difference in frequency information is stable, and the difference can be used to identify the left ear and the right ear. Therefore, this can help the headset terminal accurately identify and determine a left-ear or right-ear wearing status of the earphone 10/20, and accurately send a left-channel or right-channel signal. The user does not need to manually switch the earphone 10/20. This greatly improves the convenience of using the headset terminal.

Figure 4:
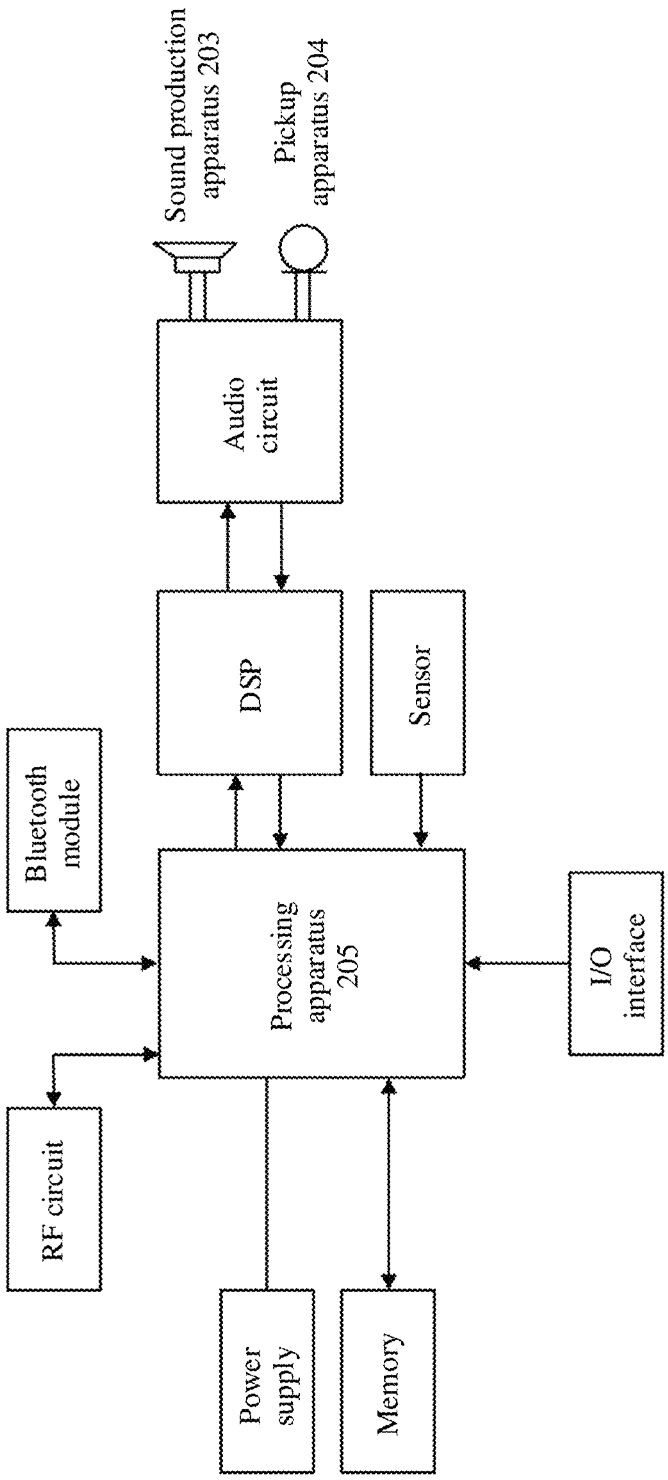
FIG. 4 is a diagram of an operating circuit of a headset terminal according to Embodiment 1 of the present disclosure.

As shown in FIG. 4, the headset terminal includes an operating circuit, and the sound production apparatus 203, the pickup apparatus 204, and the processing apparatus 205 are connected to the operating circuit. The processing apparatus 205 is connected to a power supply, a memory, a radio frequency (RF) circuit, a Bluetooth module, a digital signal processor (DSP), a sensor, and an input/output (I/O) interface. The digital signal processor is connected to an audio circuit, and the sound production apparatus 203 and the pickup apparatus 204 are connected to the audio circuit. The I/O interface is configured to connect to the processing apparatus 205 and a central processing unit (CPU) of the headset terminal. The power supply supplies power to the processing apparatus 205. The memory is configured to store data information, for example, preset left-channel feature information and right-channel feature information. The radio frequency circuit is configured to output, to the processing apparatus 205, a radio frequency current for generating a sound channel detection signal. The Bluetooth module is configured to provide a wireless transmission function. The sensor is configured to sense a sound channel detection signal received by the processing apparatus 205. The digital signal processor is configured to process a radio frequency current modulated by the processing apparatus 205 to convert the radio frequency current into a sound channel detection signal, and transmit the sound channel detection signal to the sound production apparatus 203 through the audio circuit; and convert a sound channel detection signal received by the pickup apparatus 204 and transmitted through the audio circuit into an induced current, and transmit the induced current to the processing apparatus 205.

Compared with a conventional technology in which an additional sensor is added to determine information of a wearing position of a headset, according to the headset terminal in this embodiment, a left-ear wearing status and a right-ear wearing status of a stereo headset can be accurately identified and determined by using an existing sound production apparatus 203 and pickup apparatus 204, and a left-channel input audio signal and a right-channel input audio signal can be accurately sent. A user does not need to manually switch earphones. This greatly improves the convenience of using the stereo headset without increasing hardware costs, and achieves stable improvement effects and significant benefits.

Embodiment 2

Embodiment 2 of the present disclosure discloses a headset terminal. A structure of the headset terminal in Embodiment 2 is basically the same as that of the headset terminal in Embodiment 1. A difference lies in that a front cavity part 100 of the headset terminal in Embodiment 2 has an asymmetric structure.

Figure 5:
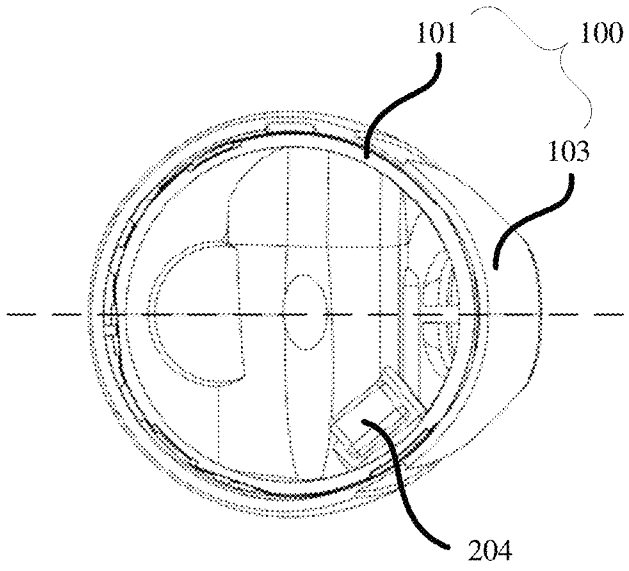
FIG. 5 is a schematic diagram of an external structure of an earphone in a headset terminal according to Embodiment 2 of the present disclosure.

As shown in FIG. 5, the front cavity part 100 includes a tip 103, the tip 103 extends from one side of a front cavity 101, and an outline of the tip 103 is symmetric with respect to a plane of symmetry. The plane of symmetry is represented by a dashed line in the figure, and the tip 103 is configured to fit into an ear canal to be coupled to the ear canal during wearing. Because of the asymmetric structure of the front cavity part 100, when a same earphone is put on a left ear or a right ear, a front cavity part 100 of the earphone is in an upper part or a lower part. In this case, different ear canal impedance occurs when a tip 103 fits into an ear canal to be coupled to the ear canal. When a left earphone and a right earphone are worn reversely, a high-frequency spectrum captured by a pickup apparatus 204 varies due to a load impedance variation in the front cavity part 100, so that different feature information is obtained as a basis for identifying a left-channel signal and a right-channel signal.

Embodiment 3

Figure 6:
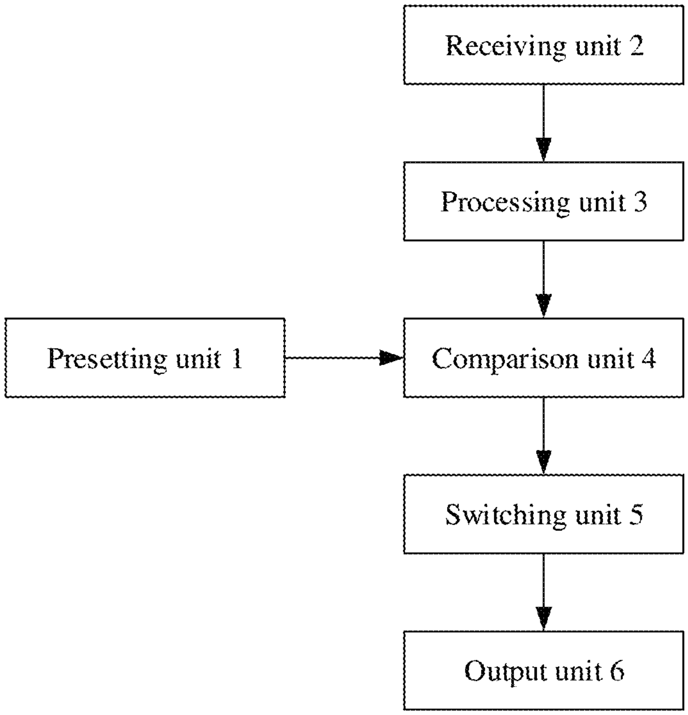
FIG. 6 is a schematic diagram of modules of a system for switching a sound channel of a headset according to Embodiment 3 of the present disclosure.

As shown in FIG. 6, Embodiment 3 of the present disclosure discloses a system for switching a sound channel of a headset. The system is mounted in the processing apparatus mentioned in Embodiment 1 and Embodiment 2 of the present disclosure. The system is configured to obtain, based on a received sound channel detection signal, feature information generated during sound transmission in a left ear and a right ear; and determine, based on an ear canal characteristic that ear canal details of the left ear and the right ear are not completely the same, whether signals output in the left ear and the right ear are correct, so as to actively switch signals of the left ear and the right ear when output signals of the left ear and the right ear do not match, and output correct sound channel signals.

Specifically, the system includes a presetting unit 1, a receiving unit 2, a processing unit 3, a comparison unit 4, a switching unit 5, and an output unit 6.

The presetting unit 1 is configured to preset left-channel feature information and right-channel feature information.

The receiving unit 2 is configured to receive a sound channel detection signal that comes from a sound production apparatus and that is picked up by a pickup apparatus in a headset terminal.

The processing unit 3 is configured to perform Fourier transform on the received sound channel detection signal to obtain feature information of a left earphone and feature information of a right earphone.

The comparison unit 4 is configured to compare the feature information of the left earphone with preset left-channel feature information, and compare the feature information of the right earphone with preset right-channel feature information, to obtain a comparison result.

The switching unit 5 is configured to switch a left-channel signal and a right-channel signal when the comparison result indicates inconsistency.

The output unit 6 is configured to output a correct left-channel signal and a correct right-channel signal.

In the system for switching a sound channel of a headset in Embodiment 3 of the present disclosure, the presetting unit presets determined left-channel feature information and right-channel feature information, so that each headset terminal has determined criteria for identifying a left-channel signal and a right-channel signal upon delivery. A left-ear wearing status and a right-ear wearing status of the headset terminal can be accurately identified and determined, and a left-channel input audio signal and a right-channel input audio signal can be accurately sent. A user does not need to manually switch a left channel and a right channel of the headset terminal. This greatly improves the convenience of using the headset terminal.

Embodiment 4

Embodiment 4 of the present disclosure provides a method for switching a sound channel of a headset. The method is intended to resolve a problem in a conventional technology that a sensor usually needs to be additionally disposed for determining whether sound channel information of a left ear and a right ear is correct, causing inconvenience for stacking and weight reduction and low identification accuracy.

Figure 7:
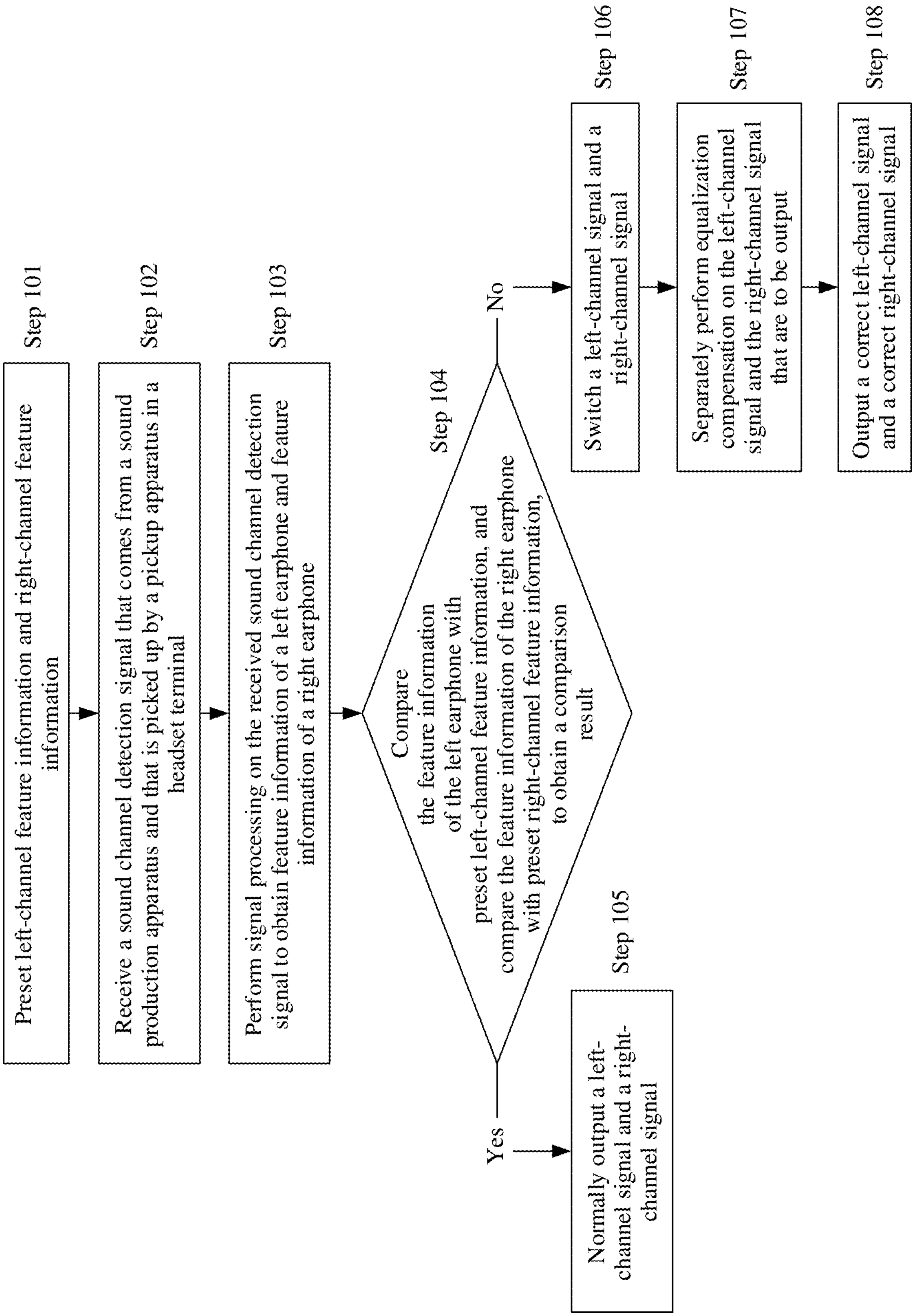
FIG. 7 is a schematic diagram of steps of a method for switching a sound channel of a headset according to Embodiment 4 of the present disclosure.

The method is performed by the system for switching a sound channel of a headset disclosed in Embodiment 3 of the present disclosure, and the system is mounted in the processing apparatus of the headset terminal disclosed in Embodiment 1 and Embodiment 2 of the present disclosure. FIG. 7 is a flowchart of steps of the method. The method includes the following steps.

Step 101: Preset left-channel feature information and right-channel feature information.

Step 102: Receive a sound channel detection signal that comes from a sound production apparatus and that is picked up by a pickup apparatus in a headset terminal.

Step 103: Perform signal processing on the received sound channel detection signal to obtain feature information of a left earphone and feature information of a right earphone.

Step 104: Compare the feature information of the left earphone with preset left-channel feature information, and compare the feature information of the right earphone with preset right-channel feature information, to obtain a comparison result. If the comparison result indicate's consistency (namely, YES), step 105 is performed. If the comparison result indicates inconsistency (namely, NO), step 106 is performed.

Step 105: Normally output a left-channel signal and a right-channel signal.

Step 106: Switch a left-channel signal and a right-channel signal.

Step 107: Separately perform equalization (EQ, Equalizer) compensation on the left-channel signal and the right-channel signal that are to be output. The left-channel signal and the right-channel signal are switched when the comparison result indicates inconsistency. A left-channel signal and a right-channel signal that are obtained through the switching operation and that are to be output are a correct left-channel signal and a correct right-channel signal.

Step 108: Output the correct left-channel signal and the correct right-channel signal. The output left-channel signal and right-channel signal are usually obtained through equalization compensation.

In the method, whether the left earphone and the right earphone output correct sound channel signals is identified according to a principle that an ear canal-eardrum impedance characteristic of a human ear affects an acoustic characteristic of an in-ear headset. In this way, the following technical effects are achieved: The headset terminal can be controlled without an operation performed by a user on a mobile terminal, so that sound channel signals of the left earphone and the right earphone can be adaptively switched.

In step 103, the signal processing is Fourier transform or time domain algorithm transform. The time domain algorithm may be Pearson correlation, time lag cross-correlation, or another time domain algorithm. The feature information preset in step 101 may be a preset feature spectrum or a preset time domain feature. When the preset left-channel feature information and right-channel feature information are feature spectra, a frequency band of the feature spectra ranges from 1 kHz to 10 kHz. When the preset left-channel feature information and right-channel feature information are time domain features, detected feature information is compared with the preset time domain features for switching between a left channel and a right channel. An example in which the preset feature information is a feature spectrum is used for description below.

Figure 8:
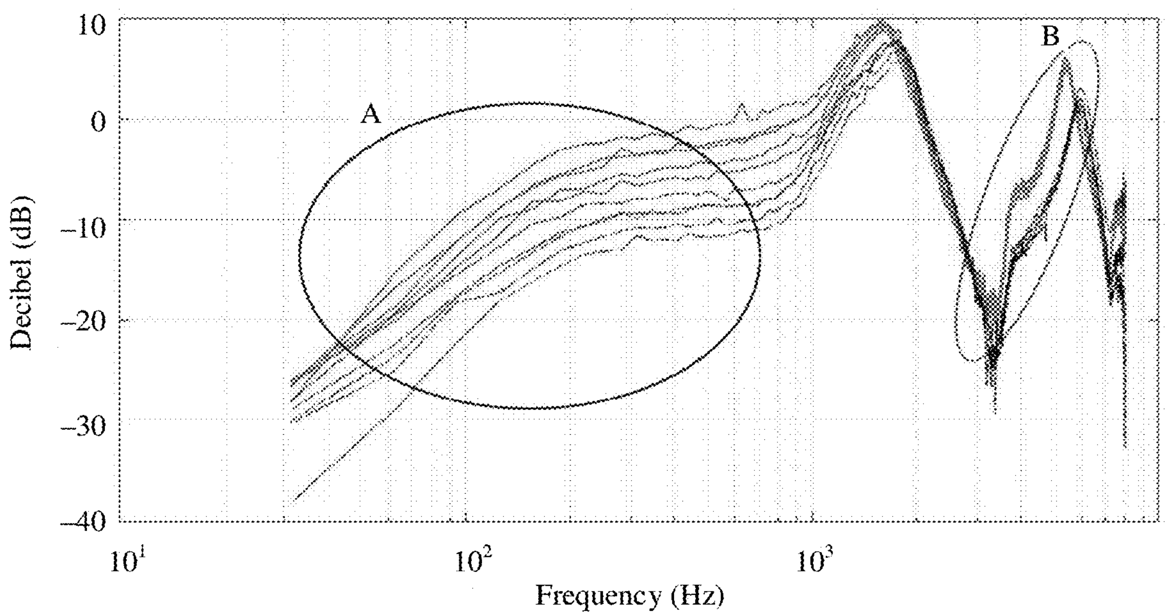
FIG. 8 is a diagram of spectrum features for identifying a left ear and a right ear by a feedback microphone in step 104 of a method for switching a sound channel of a headset according to Embodiment 4 of the present disclosure.

The headset terminal has the structure disclosed in Embodiment 1 of the present disclosure. To be specific, feedback microphones serving as pickup apparatuses in a left earphone and a right earphone are disposed at different positions, and are not disposed on planes of symmetry of the earphones. Structures of front cavity parts of the earphones for a left channel and a right channel are different, and structures of a left ear canal and a right ear canal are also different. Therefore, when earphones equipped with same players are put on a left ear and a right ear, high frequency parts (1 kHz to 10 kHz) received by feedback microphones are significantly different in spectrum curves. In addition, due to a difference between a position of a feedback microphone in the left earphone and a position of a feedback microphone in the right earphone, feature information obtained by processing sound channel detection signals captured by the feedback microphones is different due to a load impedance variation in front cavity parts. Therefore, based on the difference, in a design and development stage, feature information of sound channel signals for a left ear and a right ear may be pre-tested, and feature information obtained in an actual test of the feedback microphones is compared with preset feature spectrum. If the feature information is the same, it is determined that the earphones are worn normally. If the feature information is different, output signals for the left ear and the right ear need to be switched, and then a correct left-channel signal and a correct right-channel signal are output. Left-channel feature information and right-channel feature information used for comparison are preset, so that each headset terminal can have determined criteria for identifying a left-channel signal and a right-channel signal upon delivery. It can be learned from FIG. 8 that low-frequency spectra in a circle A are greatly affected by a wearing manner and leakage and are unstable, and spectra at 1 kHz to 10 kHz in a circle B significantly vary. A medium and high frequency reflects a difference between human ear canals and a difference between microphone placement positions. These differences can serve as features for identifying wearing on a left ear and wearing on a right ear. In step 104, the left ear and the right ear can be identified based on the difference feature, and then the left-channel signal and the right-channel signal are switched when the obtained feature information is different from the preset feature information. Then before the signals are output, step 107 is performed to perform equalization compensation. This can ensure a balance and sound quality of output audio signals of the left earphone and the right earphone. Finally, the correct left-channel signal and the correct right-channel signal are output.

In the foregoing method, a difference between positions of the feedback microphones in the ear canals causes a fixed frequency response difference between the left ear and the right ear, and the frequency response difference does not change with a degree of tightness of wearing (that is, a leakage amount). Therefore, a left-ear wearing status and a right-ear wearing status of the headset terminal can be accurately identified and determined, and a left-channel input audio signal and a right-channel input audio signal can be accurately sent. The user does not need to manually switch sound channels of the earphones. This greatly improves the convenience of using the earphones.

In the method in Embodiment 4, the left-channel feature information and the right-channel feature information in step 101 are prestored in the memory (refer to FIG. 4) of the headset terminal in Embodiment 1 of the present disclosure, to be invoked for comparison, and may be obtained in the following two processes.

Figure 9:
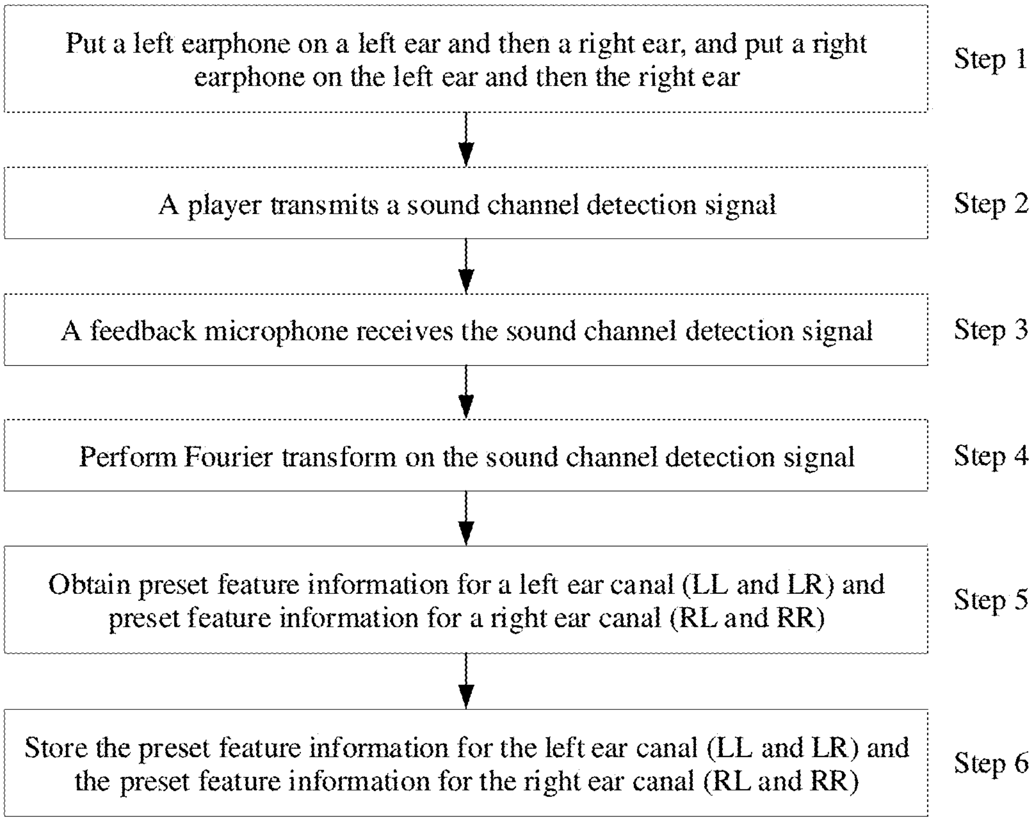
FIG. 9 is a flowchart of a first method for obtaining preset left-channel feature information and right-channel feature information in a method for switching a sound channel of a headset according to Embodiment 4 of the present disclosure.

In a first process, feature spectra of sound channel detection signals sent in the case of wearing on a left ear and wearing on a right ear are recorded for a plurality of times, and all recorded feature spectra are fitted, and finally recorded as left-channel feature information and right-channel feature information as a basis for identifying the left ear and the right ear through comparison. A specific process is shown in FIG. 9.

- Step 1: Put a left earphone on a left ear and then a right ear, and put a right earphone on the left ear and then the right ear.
- Step 2: A player transmits a sound channel detection signal.
- Step 3: A feedback microphone receives the sound channel detection signal.
- Step 4: Perform Fourier transform on the sound channel detection signal.
- Step 5: Obtain preset left-channel feature information (LL and LR) and right-channel feature information (RL and RR).
- Step 6: Store the preset left-channel feature information (LL and LR) and right-channel feature information (RL and RR).

An advantage of the first process lies in that accurate left-channel feature information and right-channel feature information can be obtained as a reference basis. A frequency band within 1 kHz to 10 kHz serves as a spectrum identification feature. After identification is performed, equalization compensation is performed on medium and high spectra, to ensure a balance and sound quality for the left ear and the right ear.

Figure 10:
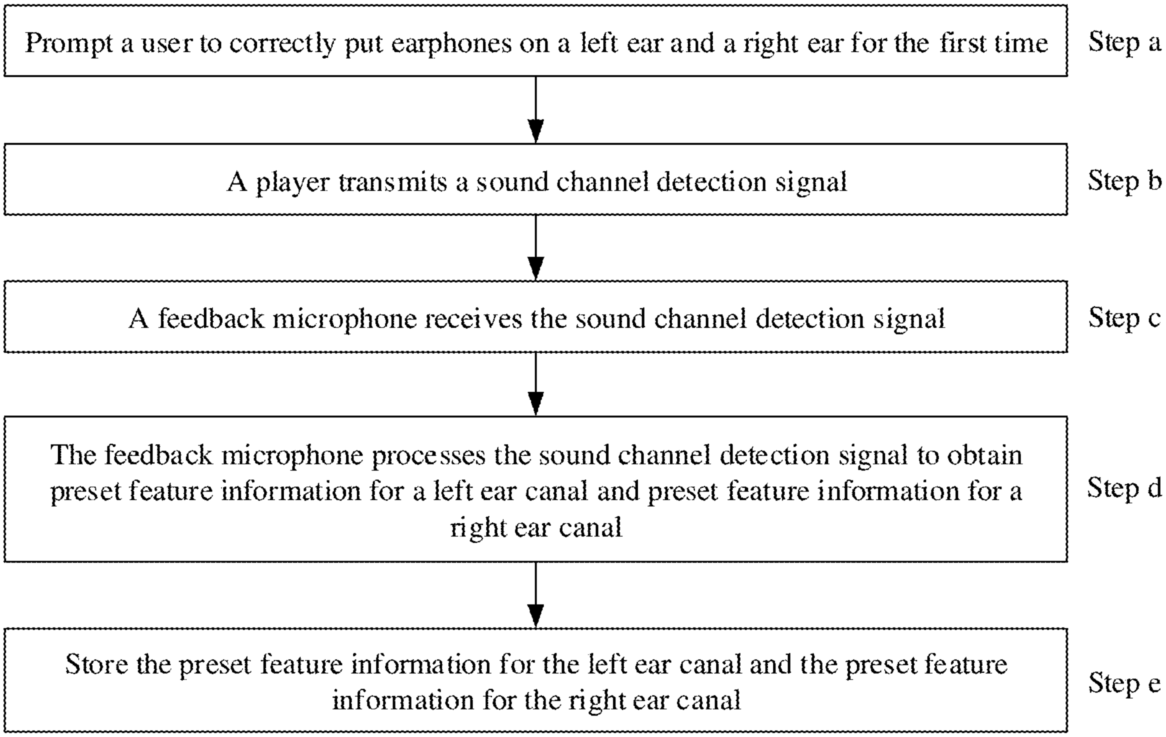
FIG. 10 is a flowchart of a second method for obtaining preset left-channel feature information and right-channel feature information in a method for switching a sound channel of a headset according to Embodiment 4 of the present disclosure.

In a second process, sound channel detection signals for a left ear and a right ear that are captured when a user correctly wears a headset terminal for the first time are recorded, and feature spectra obtained by processing the sound channel detection signals are respectively recorded as left-channel feature information and right-channel feature information. A specific process is shown in FIG. 10.

- Step a: Prompt a user to correctly put earphones on a left ear and a right ear for the first time.
- Step b: A player transmits a sound channel detection signal.
- Step c: A feedback microphone receives the sound channel detection signal.
- Step d: The feedback microphone processes the sound channel detection signal to obtain preset left-channel feature information and right-channel feature information.
- Step e: Store the preset left-channel feature information and right-channel feature information.

First, it is ensured that the user correctly puts on the earphones on the left ear and the right ear for the first time. Then a group of feature spectra may be recorded based on the wearing, and stored in a feature database for the earphones. Then the user may not need to specially distinguish between the left ear and the right ear, and the earphones may automatically detect feature information of the left ear and the right ear after the earphones are put on. If feature information of the left ear and the right ear is consistent with the feature spectra detected during the first wearing, it can be determined that the earphones are correctly worn; otherwise, sound channels are automatically switched, and then correct audio signals are output to the left ear and the right ear. Regardless of which process is used, the preset left-channel feature information and the preset right-channel feature information are stored in the memory (refer to FIG. 4) of the headset terminal in Embodiment 1 of the present disclosure.

In the method for switching a sound channel of a headset in Embodiment 4 of the present disclosure, no feature spectrum needs to be preset, and the feature spectra for the left ear and the right ear are generated based on the first correct wearing of the user. Therefore, accuracy is higher. In addition, because only the difference between the left ear canal and the right ear canal is used, the earphone (including positions of the front cavity part and the feedback microphone) can be designed to be in a perfectly symmetric form.

Embodiment 5

Embodiment 5 of the present disclosure provides a computer-readable storage medium, including a program or instructions. When the program or instructions run on a computer, the method in Embodiment 3 of the present disclosure is performed.

In the method and the system for switching a sound channel of a headset, and the headset terminal that are disclosed in embodiments of the present disclosure, a left-ear wearing status and a right-ear wearing status of the headset terminal can be accurately identified and determined, and a left-channel input audio signal and a right-channel input audio signal can be accurately sent. A user does not need to manually switch a left channel and a right channel of the headset terminal. This greatly improves the convenience of using the headset terminal.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of processes or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may be aware that, in combination with examples described in embodiments disclosed in this specification, units and algorithm steps can be implemented by electronic hardware, computer software, or a combination thereof. To clearly describe interchangeability between hardware and software, the foregoing generally describes compositions and steps of the examples based on functions. Whether the functions are performed by hardware or software depends on particular applications and design constraints of technical solutions. A person skilled in the art may use different methods to implement the described functions for each particular application, but it should not be considered that the implementation goes beyond the scope of the present disclosure.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for switching a sound channel of a headset, comprising:

receiving a sound channel detection signal that comes from a sound production apparatus and that is picked up by a pickup apparatus in a headset terminal;

performing signal processing on the received sound channel detection signal to obtain feature information of a left earphone and feature information of a right earphone;

comparing the feature information of the left earphone with preset left-channel feature information, and comparing the feature information of the right earphone with preset right-channel feature information, to obtain a comparison result; and when the comparison result indicates inconsistency, switching between a left-channel signal and a right-channel signal, and outputting a left-channel signal and a right-channel signal after switching between the left-channel signal and the right-channel signal, wherein before the receiving of the sound channel detection signal, the method further comprises:

presetting left-channel feature information and right-channel feature information, and wherein the presetting of the left-channel feature information and right-channel feature information further comprises:

receiving one or more presetting sound channel detection signals that are from the sound production apparatus and picked up by the pickup apparatus, wherein the one or more presetting sound channel detection signals are detected when the left earphone is positioned in a left ear and successively positioned in a right ear, and when the right earphone is positioned in the left ear and successively positioned in the right ear;

obtaining the preset left-channel feature information and right-channel feature information based on the received presetting sound channel detection signals; and storing the preset left-channel feature information and right-channel feature information.

2. The method according to claim 1, wherein the presetting of left-channel feature information and right-channel feature information further comprises:

prompting a user to correctly put the earphones in a left ear and a right ear for the first time;

and storing the preset left-channel feature information and right-channel feature information, after the pickup apparatus receives the sound channel detection signal from the sound production apparatus and processes the sound channel detection signal to obtain the preset left-channel feature information and right-channel feature information.

3. The method according to claim 1, wherein before a left-channel signal and a right-channel signal are output, the method further comprises:

separately performing equalization compensation on the left-channel signal and the right-channel signal that are to be output.

4. The method according to claim 1, wherein a frequency band of the preset left-channel feature information and right-channel feature information ranges from 1 kHz to 10 kHz.

5. The method according to claim 1, wherein the signal processing is Fourier transform or time domain algorithm transform.

6. A system for switching a sound channel of a headset, wherein the system comprises a receiver, at least one processor, a comparator, a switch, and an output, wherein the receiver is configured to receive a sound channel detection signal that comes from a sound production apparatus and that is picked up by a pickup apparatus in a headset terminal;

the at least one processor is configured to perform signal processing on the received sound channel detection signal to obtain feature information of a left earphone and feature information of a right earphone;

the comparator is configured to compare the feature information of the left earphone with preset left-channel feature information, and compare the feature information of the right earphone with preset right-channel feature information, to obtain a comparison result;

the switch is configured to switch between a left-channel signal and a right-channel signal when the comparison result indicates inconsistency; and the output is configured to output a left-channel signal and a right-channel signal after switching between the left-channel signal and the right-channel signal, wherein the at least one processor is further configured to preset left-channel feature information and right-channel feature information, and wherein the presetting of the left-channel feature information and right-channel feature information further comprises:

receiving one or more presetting sound channel detection signals that are from the sound production apparatus and picked up by the pickup apparatus, wherein the one or more presetting sound channel detection signals are detected when the left earphone is positioned in a left ear and successively positioned in a right ear, and when the right earphone is positioned in the left ear and successively positioned in the right ear, obtaining the preset left-channel feature information and right-channel feature information based on the receive setting sound channel detection signals; and storing the preset left-channel feature information and right-channel feature information.

7. A headset terminal, comprising two earphones and a system for switching a sound channel, wherein the system is mounted in the earphones;

wherein the system comprises a receiver, at least one processor, a comparator, a switch, and an output, wherein the receiver is configured to receive a sound channel detection signal that comes from a sound production apparatus and that is picked up by a pickup apparatus in a headset terminal;

the at least one processor is configured to perform signal processing on the received sound channel detection signal to obtain feature information of a left earphone and feature information of a right earphone;

the comparator is configured to compare the feature information of the left earphone with preset left-channel feature information, and compare the feature information of the right earphone with preset right-channel feature information, to obtain a comparison result;

the switch is configured to switch between a left-channel signal and a right-channel signal when the comparison result indicates inconsistency; and the output is configured to output a left-channel signal and a right-channel signal after switching between the left-channel signal and the right-channel signal, wherein the earphone comprises a front cavity part and a body part, and the body part is connected to the front cavity part;

the front cavity art comprises a front cavity and an earphone sleeve, and the earphone sleeve covers the front cavity; and the body part comprises a housing, a front cover, a sound production apparatus, a pickup apparatus, and a processing apparatus, wherein the housing is connected to the front cavity, the front cover is disposed at a junction between the housing and the front cavity and seals a frontend of the housing that is close to the front cavity, the sound production apparatus, the pickup apparatus, and the processing apparatus are all mounted in a cavity sealed by the front cover mounting positions of pickup apparatuses in the two earphones are different, and the sound production apparatus and the pickup apparatus are electrically connected to the processing apparatus.

8. The headset terminal according to claim 7, wherein the earphone has an outline that is symmetric with respect to a plane of symmetry, the pickup apparatus is located on one side of the plane of symmetry of the earphone, and a distance between the pickup apparatus and the plane of symmetry is at least 2 millimeters.

9. The headset terminal according to claim 8, wherein the front cavity part is asymmetric with respect to the plane of symmetry, and a volume of the front cavity part is at least 0.2 cubic centimeter.

10. The headset terminal according to claim 8, wherein the front cavity part further comprises a tip extending from one side of the front cavity, and an outline of the tip is symmetric with respect to the plane of symmetry.

11. The headset terminal according to claim 7, wherein the sound production apparatus, the pickup apparatus, and the processing apparatus are connected to an operating circuit of the headset terminal, the processing apparatus is connected to a power supply, a memory, a radio frequency circuit, a Bluetooth module, a digital signal processor, a sensor, and an input/output interface, the digital signal processor is connected to an audio circuit, and the sound production apparatus and the pickup apparatus are connected to the audio circuit.

12. The headset terminal according to claim 7, wherein the at least one processor is further configured to preset left-channel feature information and right-channel feature information.

* * * * *